US005566921A

United States Patent [19]

Yokota et al.

[11] Patent Number: 5,566,921

[45] Date of Patent: Oct. 22, 1996

[54] SOLENOID VALVE

[75] Inventors: Toru Yokota; Hiroshi Ishiwata, both of Higashimatsuyama, Japan

[73] Assignee: Zexel Corporation, Tokyo, Japan

[21] Appl. No.: 286,974

[22] Filed: Aug. 8, 1994

[30] Foreign Application Priority Data

Aug. 6, 1993 [JP] Japan .............................. 5-047144 U
Sep. 16, 1993 [JP] Japan .............................. 5-055011 U

[51] Int. Cl.[6] .............................. F16K 31/02

[52] U.S. Cl. .............................. 251/129.22; 251/129.15; 251/129.16; 239/585.3

[58] Field of Search .............................. 251/129.01, 129.15, 251/129.16, 129.21, 129.22; 239/585.1, 585.3, 585.4, 585.5

[56] References Cited

U.S. PATENT DOCUMENTS 2,881,980 4/1959 Beck et al. .............................. 251/129.16 X
4,711,397 12/1987 Lahiff .............................. 239/585.3 X
4,830,286 5/1989 Asslaender et al. .............................. 251/129.16
5,192,048 3/1993 Wakeman .............................. 251/129.16
5,307,997 5/1994 Wakeman .............................. 239/585.3 X

*Primary Examiner*—Kevin Lee
*Attorney, Agent, or Firm*—Wenderoth, Lind & Ponack

[57] ABSTRACT

In a solenoid valve, a gap is formed between a solenoid, which includes a stator housed within a resin mold, and a retainer that secures the solenoid on a housing. The gap communicates with a armature chamber that houses the armature mounted on a front end of a plug valve. High-pressure fuel is charged from the fluid passage into the armature chamber and flows into the gap around the solenoid to apply even pressure to the periphery of the resin mold as well as to the intake end surface of the solenoid. This prevents deformation of the resin mold and, consequently, distortion of the intake end surface. Such distortion can also be prevented by internally fitting a protective plate made of a non magnetic body in the opening ends of the coil grooves formed in the intake end surface of the stator.

18 Claims, 6 Drawing Sheets

SOLENOID VALVE

BACKGROUND OF THE INVENTION

1. Field of the Invention

The present invention relates to a solenoid valve which is used, for example, for controlling the injection quantity in a fuel injection system.

2. Description of the Related Art

A conventional solenoid valve 1 of this type is shown in FIG. 7. The value 1 is provided with a housing 2 in which a plug valve 4 is inserted in such a manner that it slides freely. The solenoid 16 is assembled into the housing 2 with a retainer 25 an the armature 13, which is secured on the front end of the plug valve 4 and which is housed in the armature chamber 17. The armature chamber 17 is formed between the housing 2 and the solenoid 16 so as to face oppose the intake end surface 37 of the solenoid 16. The structure of the solenoid 16 is known in the art. The solenoid 16 includes coils 22, housed within coil grooves 21*a* of a stator 21 and a core plate 23 which is connected with the stator 21 with a surface thereof aligned with the intake end surface 37. At the same time, a resin mold 24, formed from a synthetic resin, covers the portions of the stator 21 and the coils 22 that protrude to the outside from the core plate 23. Also, resin fills the opening area of the coil grooves 21*a* within a range so that it does not protrude from the intake end surface.

At the side portion of the plug valve 4, towards the front in the figure., a fluid passage 34 is formed, which communicates with the compression space of the injection pump, and communication between the fluid passage 34 and the armature chamber 17 is adjusted by the valve mechanism that is formed by the housing 2 and the plug valve 4. Also, the armature chamber 17 is connected with the fuel supply side via a fluid passage (not shown) and a force is applied to the plug valve 4 by a spring 9 in a direction that constantly separates the armature from the solenoid 16.

However, the fuel that charges into the armature chamber 17 via the fluid passage 34 is under extremely high pressure; for example, approximately 1500 kg/cm$^2$ during the compression phase of the injector unit, and since, in the solenoid valve 1 described above, the stator 21 of the solenoid 16 is held by the resin mold 24, when the high-pressure fuel passes around the armature and presses down on the intake end surface 37 of the solenoid 16, the resin mold 24 becomes deformed. Then, as shown in FIG. 8, both sides of the stator 21 are deformed so that they go toward the center, as indicated by the arrows, to distort the intake end surface 37 of the stator 21. Note that in FIG. 8 the distortion is greatly exaggerated to facilitate explanation.

The gap between the stator 21 and the armature 13 is extremely small; approximately 0.1–0.2 mm, and there is a problem in that if the stator 21 becomes distorted as shown in FIG. 8, every time high-pressure fuel is charged, the gap between the stator 21 and the armature 13 changes, making the performance of the solenoid valve unstable.

Also, there are problems such as the fact that the surface of the solenoid undergoes plastic deformation over time because of the charge of high-pressure fuel and the high-pressure fuel entering between the stator 21 and the resin mold 24 due to the deformation of the stator 21 to rupture the resin mold 24 as shown in FIG. 8.

One solution to the problems described above is disclosed in Japanese Patent Unexamined Publication H4-82361. Here, a thin, non-magnetic metal plate is provided on the intake end surface of the solenoid. However, as mentioned above, the gap between the stator and the armature is extremely small and the distance between the stator and the armature will increase by an amount equivalent to the thin plate and this results in reduced performance and responsiveness.

SUMMARY OF THE INVENTION

The main object of the present invention is to provide a solenoid valve in which it is possible to prevent deformation of the stator, thereby assuring maintenance of stable performance without having any reinforcement between the solenoid and the armature. Another object is to provide a solenoid valve in which there is no misalignment of the terminals when mounting the solenoid and also in which the stress that the terminals are subject to is reduced to prevent damage to the terminals.

To achieve the objects described above, the present invention is provided with a plug valve positioned in a housing in such a manner that it can slide freely and which adjusts the constriction of the fluid passage. An armature is secured on the plug valve and is housed in an armature chamber that communicates with the aforementioned fluid passage. A solenoid is provided facing opposite the armature and is provided with a stator which is housed in a resin mold. A retainer that mounts the aforementioned solenoid onto the aforementioned housing in such a manner that it covers the entirety of the aforementioned resin mold. Also, a spring is provided to apply a force in the direction that tends to separate the armature from the solenoid, so that a gap is formed between the aforementioned resin mold and the aforementioned retainer, and the aforementioned armature chamber communicates with the aforementioned gap.

It is desirable that the terminals of the solenoid be formed with a coaxial structure and that they be lead out along the axis of the retainer. A solenoid valve that prevents deformation of the stator, thereby securing stable performance, may also be a structure that is provided with a plug valve positioned in the housing in such a manner that it can slide freely and which adjusts the constriction of the fluid passage. An armature is secured to the plug valve and is housed in the armature chamber, which communicates with the aforementioned fluid passages. A solenoid is provided and opposes the armature. A spring that applies a force in the direction that separates the armature from the solenoid. Also, the aforementioned solenoid is provided with a stator that is housed in a resin mold and which has coil grooves formed in it providing for winding the coils from the intake end surface and a protective plate which is formed from a nonmagnetic body is internally fitted in the opening ends of the coil grooves.

Therefore, if a gap is formed around the resin mold of the solenoid that communicates with the armature chamber, when high-pressure fuel is charged from the fluid passage into the armature chamber, the high-pressure fuel is lead around the armature to the intake end surface of the stator and it will apply pressure on the intake end surface. At the same time, it is actively lead into the gap formed around the resin mold to apply an equal and opposite pressure to that applied on the intake end surface and this will be applied evenly around the resin mold. Thus, deformation of the resin mold is prevented and, consequently, distortion of the intake end surface does not occur, achieving the objects described above.

Also, by making the terminals of the solenoid a coaxial structure, and by leading them out from the axis of the retainer, no torque will be applied to the terminals and no misalignment of the lead out position of the terminals can occur regardless of the phase of the retainer relative to the housing when mounted.

Furthermore, by internally fitting a non-magnetic protective plate in the opening ends of the coil grooves, the stator is prevented from becoming compressed in the direction indicated by the arrows in FIG. 8 by the protective plate internally fitted in the opening ends of the coil grooves even when there is pressure applied on the intake end surface of the stator, thus achieving the objects described above.

BRIEF DESCRIPTION OF THE DRAWINGS

Many other advantages, features and objects of the present invention will be understood by those of ordinary skill in the art by referring to the attached drawings which illustrate preferred embodiments of the present invention in which.

DETAILED DESCRIPTION OF THE PREFERRED EMBODIMENTS

The following is an explanation of the embodiments of the present invention in reference to the drawings.

Figure 1:
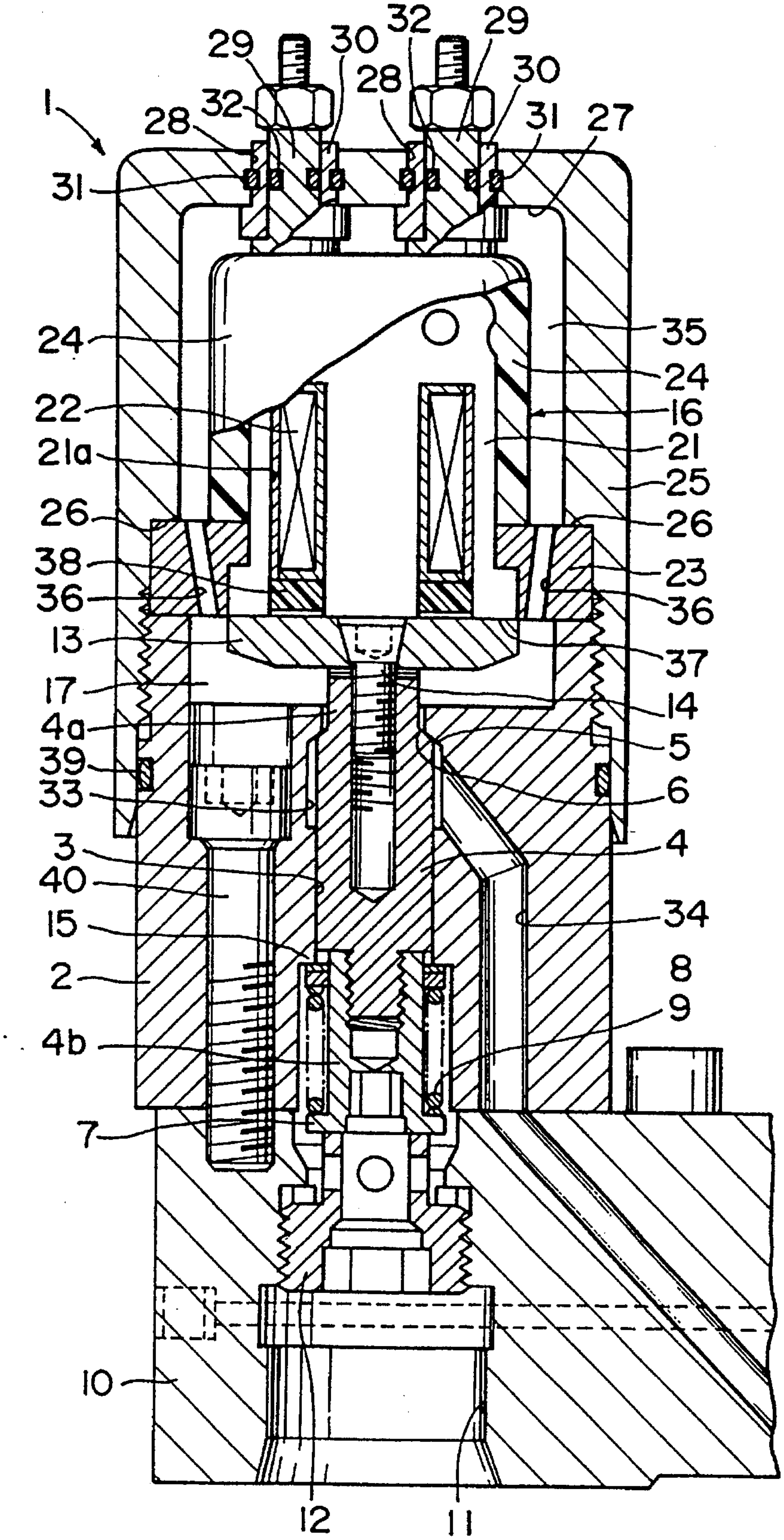
FIG. 1 is a cross section of an embodiment of a solenoid valve according to the present invention.

In FIG. 1, the solenoid valve 1 is mounted, for example, in a fuel injection pump main unit of an injector unit or the like. The plug valve 4 is inserted into a sliding hole 3 of a first housing 2 in such a manner that it can slide freely. The front end portion **4*a* of this plug valve 4 has a diameter which is slightly reduced to allow clearance from the first housing 2. In the portion of the plug valve 4 that continues from the front end portion 4*a*, a tapered portion 6 is provided, which comes in contact with a valve seat 5 that is formed in the sliding hole 3 of the first housing 2. The valve seat 5 and the tapered portion 6 constitute a valve mechanism. Also, the base end portion 4*b* of the plug valve 4 is structured with a separate material and is provided with a flange portion 7. Between the flange portion 7 of the base end portion 4*b* and a spring receptacle 15 that is formed in the first housing 2, a spring housing chamber 8 is formed and a spring 9, which is housed and held in the spring housing chamber 8, applies a constant force to the aforementioned tapered portion 6 in such a manner that it tends to separate from the valve seat 5**.

A second housing 10 that communicates with the injection pump main unit is mounted on the first housing 2 by a bolt 40. A communicating hole 11 is formed in the second housing 10 at a position where it is aligned with the sliding hole 3 of the first housing 2 and a stopper 12, that regulates the maximum range of movement of the plug valve 4, is threaded into the communicating hole 11.

An armature 13 is secured on to the front end portion **4*a* of the plug valve 4 that protrudes out from the sliding hole 3 with a mounting screw 14. The armature 13 is housed in an armature chamber 17, which is formed between the first housing 2 and a solenoid 16. The solenoid 16 is mounted on the first housing 2 with the retainer 25 and the armature 13 faces opposite an intake end surface 37 of the solenoid 16**.

In the solenoid 16, a coils 22 are wound around in coil grooves **21*a* in a stator 21 which is structured by laminating a plurality of thin plates. The stator 21 is connected to a core plate 23, which is formed of a non-metalallic metal, to align the end surface of the core plate 23 and the intake end surface 37 of the stator 21. Also, the portions of the stator 21 and coils 22 that project away from the intake end surface 37 are housed and held in a resin mold 24, which is formed of a synthetic resin. At the same time, opening end portions of the coil grooves 21*a* are sealed off with a sealing member 38** formed of a synthetic resin.

The solenoid 16 is housed in the retainer 25 which is formed in a cylindrical shape with one end closed. The core plate 23 is in contact with a staged portion 26 that is provided on the inner wall of the retainer 25 and two terminals 29 are lead out via insulating bodies 30 through lead-out holes 28 formed in the closed end 27 of the retainer 25. O-rings 31, 32 are provided between the retainer 25 and the insulating bodies 30 and between the insulating bodies 30 and the terminals 29 to ensure an air tight seal. The peripheral edge of the core plate 23 is positioned at the front end of the first housing 2 and the core plate 23 is clamped between the first housing 2 and the retainer 25 with the retainer 25 connected by screwing on to the external circumference of the first housing 2. Note that reference number 39 indicates an o-ring which is provided to ensure air tightness between the first housing 2 and the retainer 25.

A toroidal depressed portion 33, with a slightly larger diameter, is formed in the sliding hole 3 in an area that extends from the valve seat 5 towards the base end portion in the first housing 2. The fluid passage 34 that leads to the compression space of the injection pump main unit communicates with the toroidal depressed portion 33. The toroidal depressed portion 33 functions as a communicating groove for leading fuel from the high-pressure side fluid passage 34 to the armature chamber 17 when the tapered portion 6 is away from the valve seat 5.

Also, the retainer 25 is mounted in such a manner that it is not in contact with the resin mold 24 of the solenoid 16, Thus a gap 35 is created between the resin mold 24 and the retainer 25. A communicating passage 36, which communicates between the armature chamber 17 and the gap 35, is formed in the core plate 23. Thus the pressure in the armature chamber 17 and the pressure in the gap 35 are always equal.

Note that the power supply to the aforementioned solenoid 16 is controlled with a control unit (not shown).

In the structure described above, when power is supplied to the solenoid 16 to pull the armature 13 toward the stator 21, the tapered portion 6 of the plug valve 4 becomes seated on the valve seat 5 to cut off communication between the fluid passage 34 and the armature chamber 17 and the fuel within the fluid passage is under high pressure. When the power supply to the solenoid 16 ceases, the plug valve 4 is moved by the spring 9 in the direction which separates the armature 13 from the intake end surface 37 of the solenoid 16 and the tapered portion 6 of the plug valve 4 becomes unseated from valve seat 5 so that the armature chambers 17 and the fluid passage 34 are in communication with each other and the high-pressure fuel rapidly charges the armature chamber 17.

At this time, the charged fuel passes around the armature 13 to press down on the intake end surface 37, but at the same time, it also goes around into the gap 35 via the communicating hole 36. As a result, the pressure applied to the resin mold at the intake end surface and the pressure that directly presses on the resin mold from the opposite side, are balanced, and this prevents deformation of the resin mold and consequently prevents any distortion of the intake end surface 37.

Therefore, deformation of the intake end surface and damage to the resin mold are prevented and, at the same time, by leading the fuel to the periphery of the solenoid, an additional cooling effect on the solenoid itself is provided. Furthermore, since it is not necessary to provide reinforcement between the solenoid and the armature to prevent deformation and damage to the solenoid, problems of reduced performance and responsiveness of the solenoid valve are eliminated.

Figure 2:
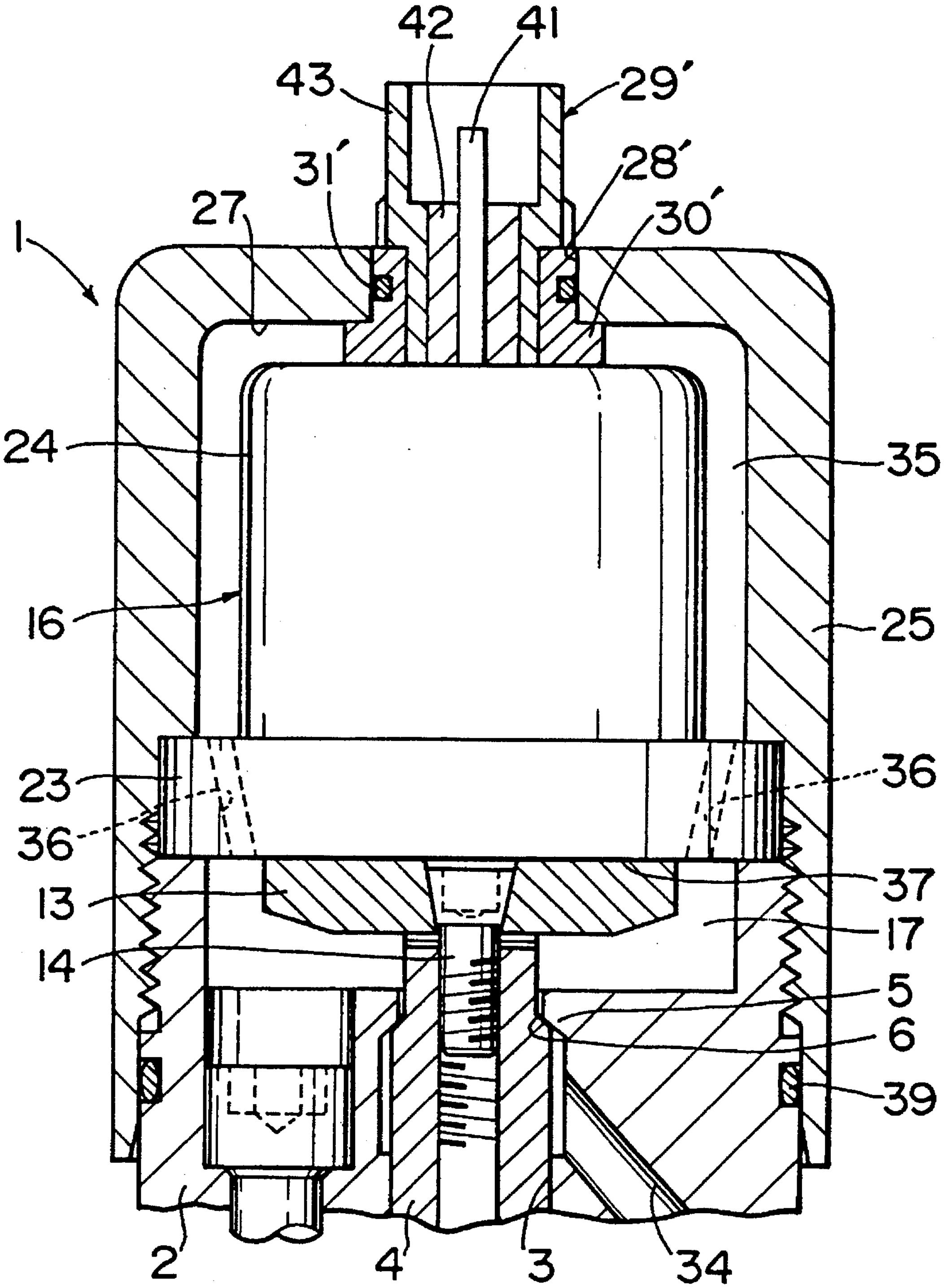
FIG. 2 is a cross section of the essential parts of another embodiment of a solenoid valve according to the present invention.

When mounting the solenoid in the solenoid valve described above, the two terminals 29 are lead out from the lead-out holes 28, the solenoid 16 is internally fitted in the retainer 25 in such a manner that the core plate 23 is in contact with the staged portion 26 and the retainer 25 is connected by screwing it onto the first housing 2 in that state. However, since, in this structure, the terminals 29 rotate along with the retainer 25, there is a problem in that the position of the terminals will vary for each solenoid valve assembled, causing inconvenience in wiring depending upon the installation location of the solenoid valve. FIG. 2 shows an embodiment that overcomes this problem. The following explanation only deals with the structures that are different from those in the first embodiment. Identical parts are assigned with the same reference numbers and explanation of them is omitted.

In this embodiment, the coaxial terminal 29' is provided at the center of the bottom of the resin mold 24 of the solenoid 16, and the retainer 25 is provided with a lead-out hole 28' aligned with the retainer axis for leading out the coaxial terminal 29'. This lead-out hole 28' is formed in the closed end 27 of the retainer. The coaxial terminal 29' is provided with a central contact 41 that constitutes the negative electrode and an external contact 43 that constitutes the positive electrode and which is provided in circular form around central contact 41. The glass filler sealing member 42 is provided between the contacts. An insulating body 30' is secured to the external circumference of the external contact 43 and the insulating body 30' is fitted into the lead-out hole 28' via an o-ring 31' for air tightness.

With this terminal structure, even when threading the retainer 25 that houses and holds the solenoid 16 onto the first housing 2, since the terminal 29' is lead out from the center of the retainer 25, separate positioning of the terminal for each solenoid valve is not required, thus eliminating any problems in wiring. Also, since no torque is applied to the terminal 29' itself when the retainer is tightened, damage to the terminal is also prevented.

Figure 3:
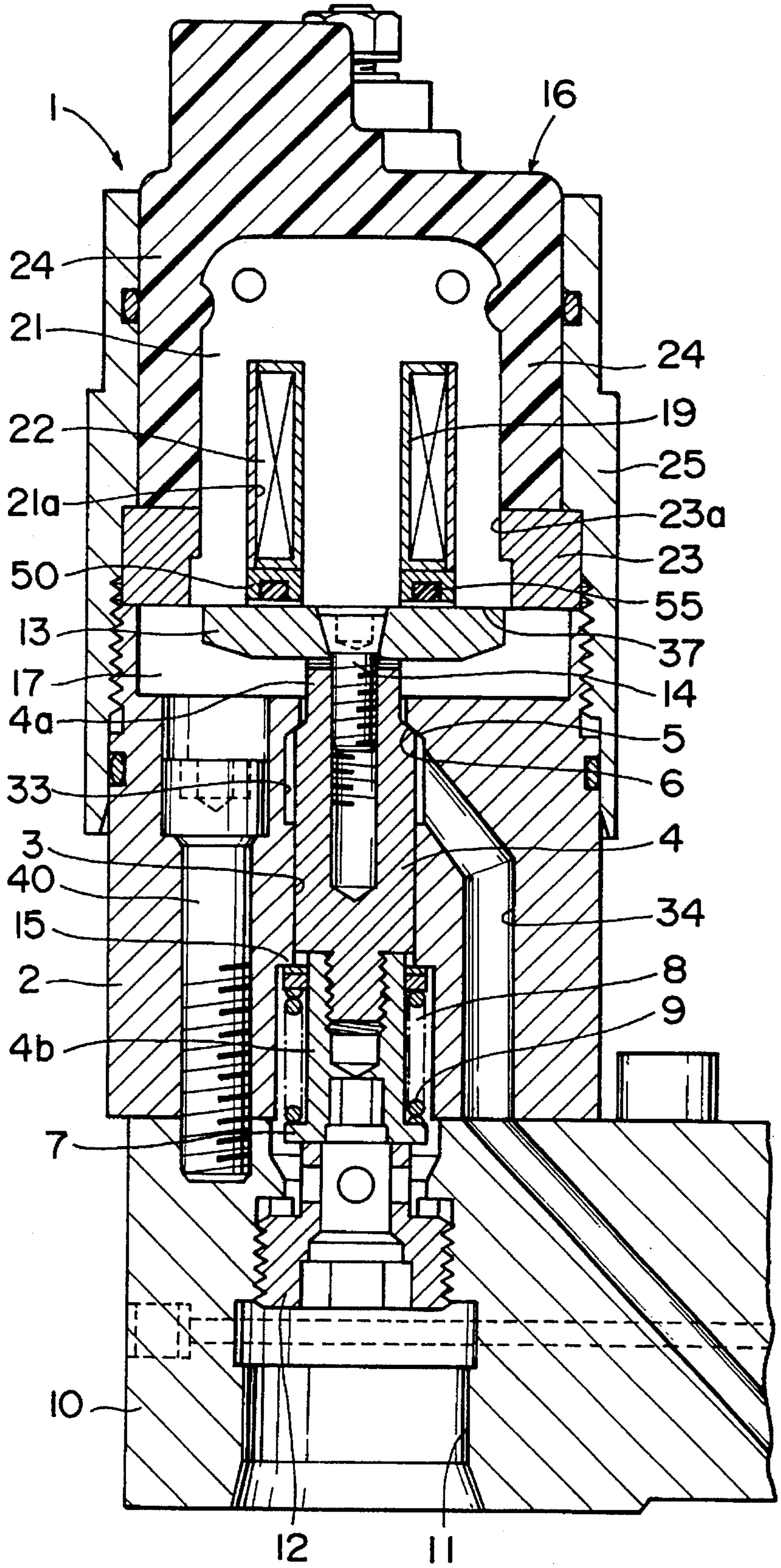
FIG. 3 is a cross section of yet another embodiment of a solenoid valve according to the present invention.
Figure 4:
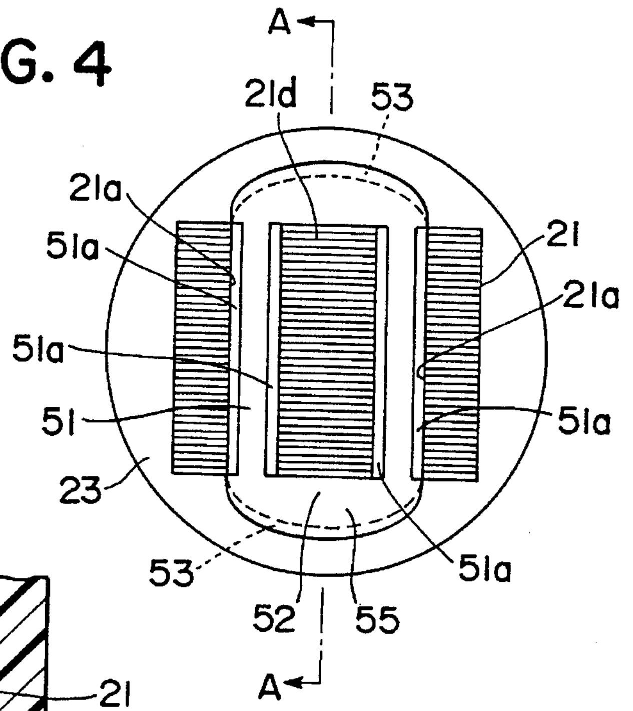
FIG. 4 is the solenoid shown in FIG. 3, viewed from the side of an intake end surface.
Figure 5:
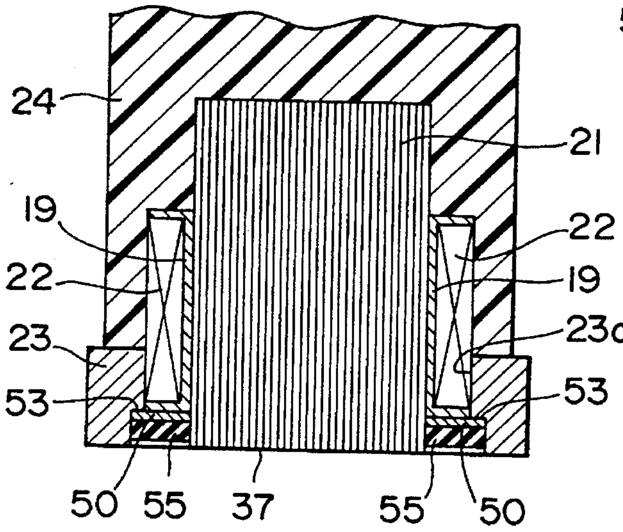
FIG. 5 is a cross section through line A—A in FIG. 4.

FIG. 3 shows another embodiment mode in which deformation of the stator is prevented. The following is a description of those aspects that are different. The aforementioned solenoid 16 is provided with the stator 21 as shown in FIG. 4 and FIG. 5 which is formed by laminating a plurality of thin plates and which is provided with two coil grooves **21*a* in the direction of the lamination. The coils 22 are wound around in the coil grooves 21*a* of the stator 21 via winding frames 19. The stator 21 and the coils 22 are fitted inside the fitting hole 23*a* that is formed in the core plate 23 which is formed of a non magnetic metal so as to align the end surface of the core plate 23 with the intake end surface 37 of the stator 21. Also, the resin mold 24 houses and holds the portions of the stator 21 and the coils 22 that project from the fitting hole 23*a* in the core plate 23. The resin mold 24 adheres tightly to the retainer 25 without any gap. In addition, a protective plate 50, which is to be explained below, is internally fitted in the opening ends of the coil grooves 21*a* in such a manner that it does not project out beyond the intake end surface 37**.

Figure 6:
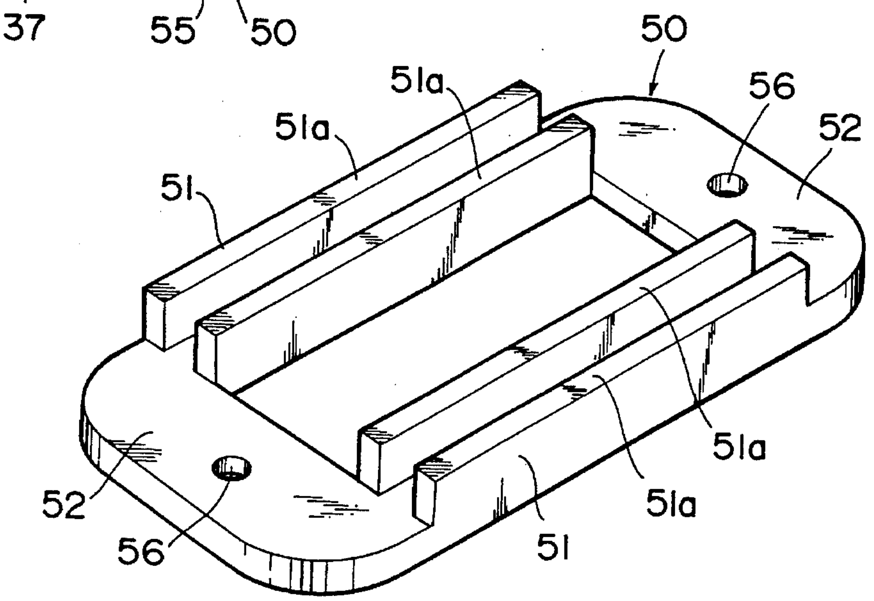
FIG. 6 is a perspective showing an actual example of a protective plate used in the solenoid.
Figure 7:
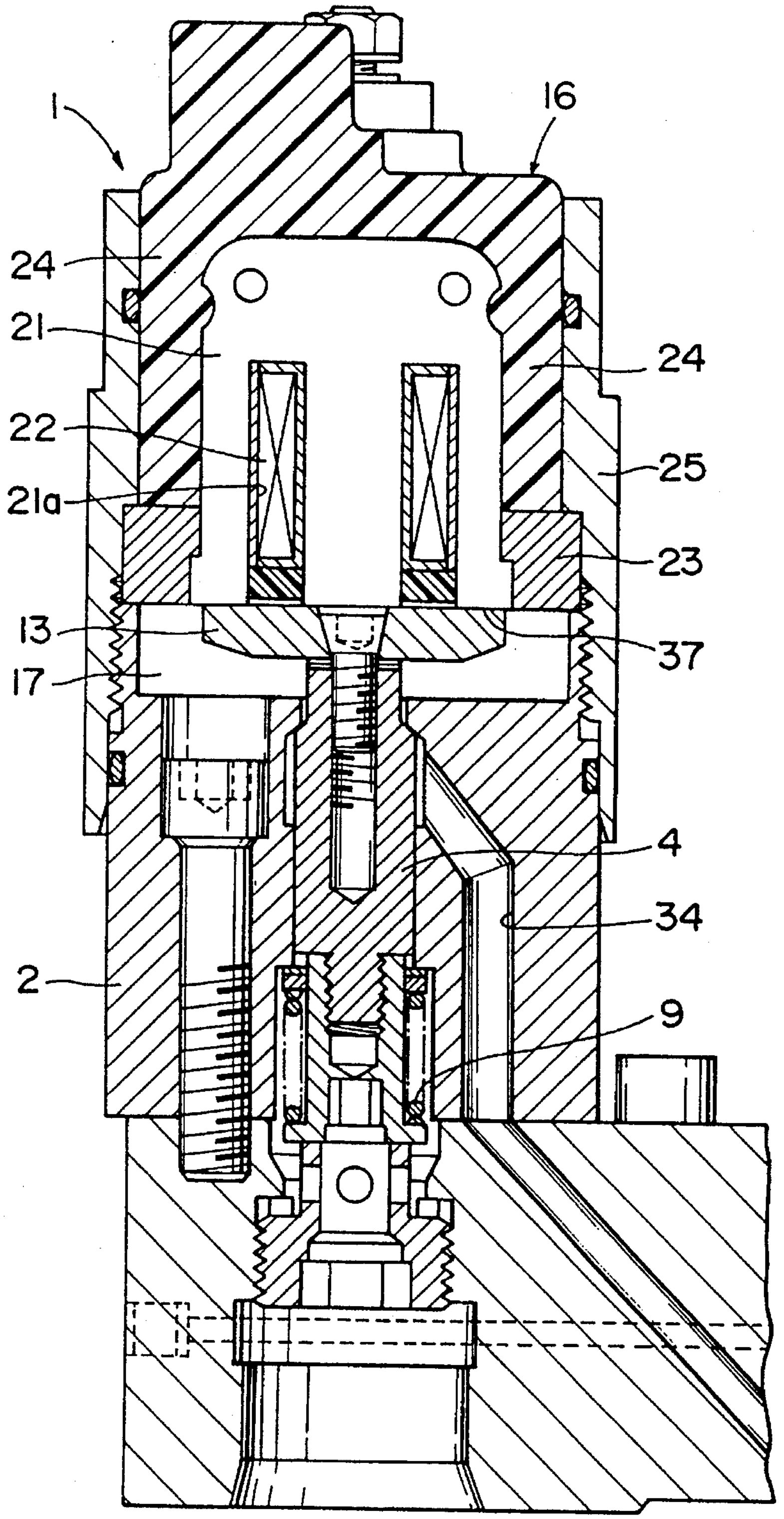
FIG. 7 Prior Art
FIG. 7 is a cross section of a solenoid valve of the prior art.

The protective plate 50 may be, for example, one piece of non magnetic metal formed by press machining. It is formed in a circular shape so that it can be fitted into the coil grooves **21*a* and, at the same time, a middle portion 21*d* of the stator 21 can be inserted as shown in FIG. 6. The plate 50 is provided with the protective portions 51 which are inserted in the coil grooves 21*a* and holding portions 52 which are formed continuous to connect the protective portions 51. The protective portions 51 are formed to match the width of the coil grooves 21*a* and they have a u-shaped cross section with protective walls 51*a* that extend in the direction of the lamination and are formed on an outer edge and an inner edge of the plate. Each of the protective portions 51 is formed in such a manner that the protective walls 51*a* are in close contact with the inner walls of the coil grooves 21*a*. The holding portions 52 are in contact with the staged portion 53 that is formed in the fitting hole 23*a* of the core plate 23 and it holds the entire protective plate 50 at a specific depth from the intake end surface 37. Resin 55 is provided on the surface of the protective plate 50 so as to leave a portion of the protective walls 51*a*** exposed.

Note that the resin 55 provided on the surface of the protective plate may also be provided with communicating holes 56 formed in the holding portions of the protective plate 50 so that the resin that is poured in when forming the resin mold 24 is led to the surface of the protective plate 50 via communicating holes 56.

With the structure described above, when power is supplied to the solenoid 16 to pull the armature 13 toward the stator 21, the tapered portion 6 of the plug valve 4 is seated on the valve seat 5 to cut off communication between the fluid passage 34 and the armature chamber 17 and the fuel within the fluid passage is under very high pressure. When the power supply to the solenoid 16 ceases, the plug valve 4 is moved by the spring 9 in the downward direction in the figure and the armature 13 is separated from the intake end surface 37 of the solenoid 16. At the same time, the tapered portion 6 becomes unseated from the valve seat 5 so that the armature chamber 17 and the fluid passage 34 are in communication with each other and the high-pressure fuel rapidly charges the armature chamber 17.

Figure 8:
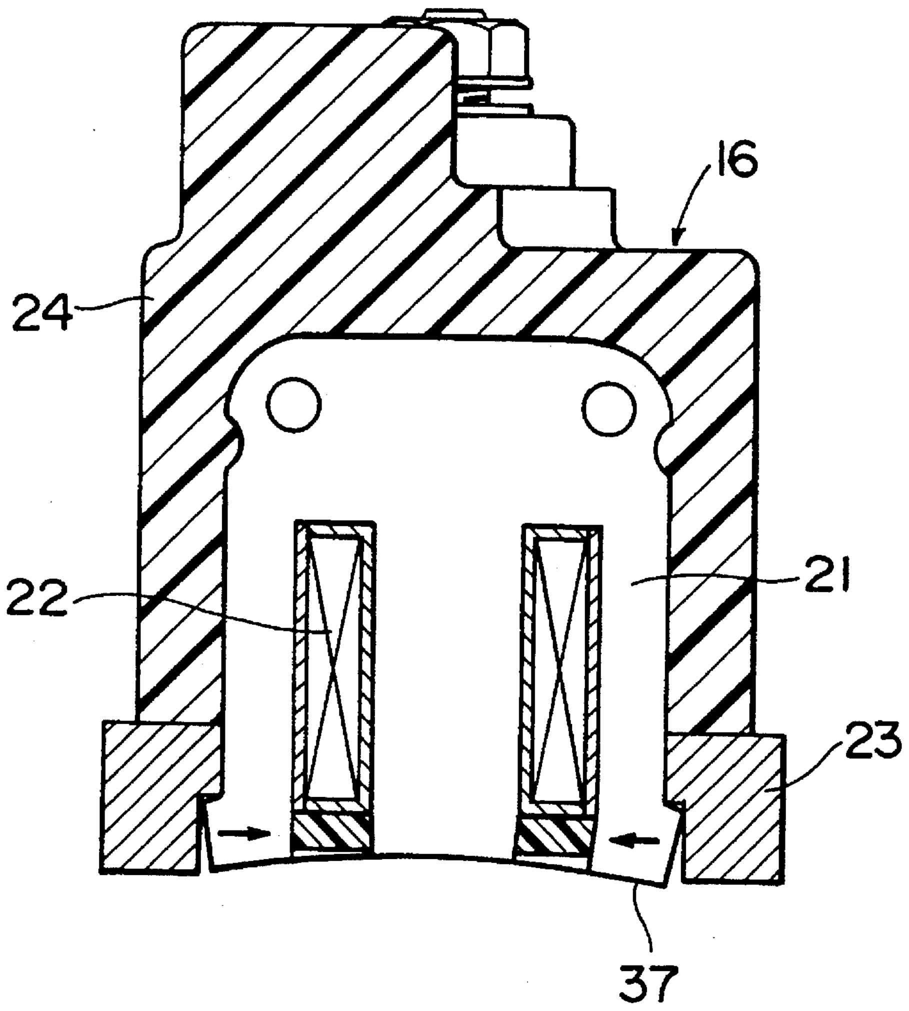
FIG. 8 Prior Art
FIG. 8 is cross section showing the state of deformation of the intake end surface of the solenoid shown in FIG. 7.

At this time, the charged fuel passes around the armature 13 to press down on the intake end surface 37 and the stator would be distorted toward the middle portion as indicated with the arrows in FIG. 8. However, the protective plate 50 is inserted in the opening ends of the coil grooves **21*a*, and deformation of the stator 21 is thereby prevented. Consequently, distortion of the intake end surface 37 is also prevented. As a result, the gap between the stator 21 and armature 13** is unaffected, enabling high performance and responsiveness of the solenoid valve to be maintained. Furthermore, since it is not necessary to provide reinforcement between the solenoid and the armature to prevent deformation of and damage to the solenoid, problems of reduced performance and responsiveness of the solenoid valve are eliminated.

Also, since the pressure in the armature chamber 17 is applied to the protective plate 50 as well as the intake end surface 37, there is a problem of the pressure applied to the protective plate 50 being communicated to the stator 21 via the coil 22. However, as the protective plate 50 is in contact with the staged portion 53 that is formed in the core plate 23, it is retained therein and does not communicate the pressure, thereby reducing the area of the stator 21 that is under pressure.

What is claimed is:

1. A solenoid valve comprising:

a housing defining a through hole, a fluid passage communicating with said through hole, and a chamber in fluid communication with said through hole;

a plug valve slidably mounted in said through hole to control communication between said through hole and said fluid passage;

an armature positioned in said chamber and connected to said plug valve;

a solenoid including a synthetic resin mold and a stator positioned in said synthetic resin mold, said solenoid located so as to oppose a surface of said armature;

a spring operatively engaging said plug valve to bias said armature in a direction away from said stator; and a retainer enclosing said synthetic resin mold and mounting said solenoid to said housing, wherein said retainer is spaced from said synthetic resin mold so as to form a gap therebetween and said chamber is in fluid communication with said gap.

2. The solenoid valve as claimed in claim 1, wherein said stator is formed of a plurality of thin plates and includes an open-ended groove formed therein, said solenoid further comprising:

a plurality of coils provided in said grooves; and a non-magnetic metal core plate connected to said stator so as to align an end surface of said stator with an end surface of said core plate.

3. The solenoid valve as claimed in claim 2, further comprising a synthetic resin seal provided at the open end of said groove.

4. The solenoid valve as claimed in claim 2, wherein said retainer is cylindrical and includes an open end, a closed end, a pair of holes therethrough and a stepped portion formed on an interior peripheral wall of said retainer, said solenoid further comprising:

a pair of terminals extending through said holes;

an air-tight seal provided between each terminal and said respective retainer hole.

5. The solenoid valve as claimed in claim 2, wherein said retainer is threadedly connected to an outer wall portion of said housing, a first peripheral surface of said core plate engages an end of said housing, and a second peripheral surface of said core plate engages said retainer so that said core plate is clamped between said housing and said retainer.

6. The solenoid valve as claimed in claim 2, further comprising a communicating passage formed in said core plate to provide communication and pressure equalization between said chamber and said gap.

7. The solenoid valve as claimed in claim 1, wherein said solenoid further comprises a plurality of coaxial terminals which extend through a central axial hole in said retainer.

8. The solenoid valve as claimed in claim 1, further comprising:

a tapered portion formed on said plug valve; and a valve seat formed on an inner peripheral wall of said housing through hole, wherein said tapered portion is engagable with said valve seat to prevent communication between said fluid passage and said chamber.

9. The solenoid valve as claimed in claim 1, wherein said fluid passage and said chamber are in fluid communication when said solenoid is not actuated, and said plug valve cuts off fluid communication between fluid passage and said chamber when said solenoid is actuated.

10. A solenoid valve comprising:

a housing defining a through hole, a fluid passage communicating with said through hole, and a chamber in fluid communication with said through hole;

a plug valve slidably mounted in said through hole to control communication between said through hole and said fluid passage;

an armature positioned in said chamber and connected to said plug valve;

a solenoid including a synthetic resin mold, a stator positioned in said synthetic resin mold, and a coil groove formed in said stator, said coil groove having an open end in a surface of said stator opposing said armature;

a spring operatively engaging said plug valve to bias said armature in a direction away from said stator; and a protective plate formed of non-magnetic material and positioned in said open end of said coil groove.

11. The solenoid valve as claimed in claim 10, wherein said open end of said coil groove is annular and said protective plate is formed in an annular shape defining a central open area which corresponds to said groove, and a central portion of said stator projects into said open central area of said protective plate.

12. The solenoid valve as claimed in claim 11, wherein said portion of said protective plate, which extends into said coil groove, includes an inner wall projecting from an interior edge of said plate and engaging an inner peripheral wall of said coil groove, and an outer wall projecting from an exterior edge of said plate and engaging an outer peripheral wall of said coil groove.

13. The solenoid valve as claimed in claim 10, further comprising an annular non-magnetic core plate connected to said stator so as to align an end surface of said stator with an end surface of said core plate, wherein said stator is comprised of a plurality of laminated thin plates and said coils are wound within said coil groove.

14. The solenoid valve as claimed in claim 13, further comprising a stepped portion formed on an inner peripheral surface of said core plate, wherein said protective plate engages said stepped portion to maintain a specific position relative to said armature.

15. The solenoid valve as claimed in claim 12, further comprising a synthetic resin provided on a portion of said protective plate in such a manner that other portions of said protective plate are not provided with a synthetic resin.

16. The solenoid valve as claimed in claim 10, further comprising a retainer threadedly connected to an outer wall portion of said housing, wherein a first peripheral surface of said core plate engages an end of said housing and a second peripheral surface of said core plate engages said retainer so that said core plate is clamped between said housing and said retainer.

17. The solenoid valve as claimed in claim 10, further comprising:

a tapered portion formed on said plug valve; and a valve seat formed on an inner peripheral wall of said housing through hole, wherein said tapered portion is engagable with said valve seat to prevent communication between said fluid passage and said chamber.

18. The solenoid valve as claimed in claim 10, wherein said fluid passage and said chamber are in fluid communication when said solenoid is not actuated, and said plug valve cuts off fluid communication between fluid said passage and said chamber when said solenoid is actuated.

* * * * *